United States Patent [19]

Bradshaw

[11] Patent Number: 4,644,664
[45] Date of Patent: Feb. 24, 1987

[54] A METHOD OF AND APPARATUS FOR DRYING MOISTURE CONTAINING MATERIAL

[76] Inventor: William Bradshaw, Dogwell Barn, Newby, Rimington, Nr. Clitheroe, Lancashire, United Kingdom

[21] Appl. No.: 357,710

[22] Filed: Mar. 12, 1982

[51] Int. Cl.⁴ .............................................. F26B 3/08
[52] U.S. Cl. .......................................... 34/10; 34/35; 34/57 A; 34/86
[58] Field of Search ................... 34/16, 41, 35, 73, 77, 34/86, 242, 10, 57 R, 57 A; 68/5 D, 5 E

[56] References Cited

U.S. PATENT DOCUMENTS

| | | | |
|---|---|---|---|
| 2,192,168 | 6/1940 | Bell | 34/24 |
| 2,622,342 | 12/1952 | Goulounes et al. | 34/169 |
| 3,032,890 | 5/1962 | Brick et al. | 34/242 |
| 3,199,223 | 8/1965 | Carlson | 34/41 |
| 3,654,705 | 4/1972 | Smith et al. | 34/10 |
| 3,783,649 | 1/1974 | Yamamoto et al. | 68/5 E |
| 3,800,427 | 4/1974 | Kemmetmueller | |
| 4,150,494 | 4/1979 | Brothchild | 34/242 |
| 4,223,452 | 9/1980 | Chambers | 34/35 |
| 4,348,817 | 9/1982 | Bradshaw | 34/75 |
| 4,404,699 | 9/1983 | Sando et al. | 68/5 E |
| 4,411,075 | 10/1983 | Blaudszun | 34/41 |

FOREIGN PATENT DOCUMENTS

| | | |
|---|---|---|
| 1269748 | 4/1972 | United Kingdom . |
| 1304407 | 1/1973 | United Kingdom . |
| 1363291 | 8/1974 | United Kingdom . |
| 1558913 | 1/1980 | United Kingdom . |
| 2059035A | 4/1981 | United Kingdom . |

Primary Examiner—Albert J. Makay
Assistant Examiner—David W. Westphal
Attorney, Agent, or Firm—Quaintance, Murphy & Presta

[57] ABSTRACT

The invention provides both a method and apparatus for drying moisture-containing materials, in which the material is dried in a drying chamber. A heat exchanger is provided in the drying chamber, and while air is prevented from entering the chamber, vapor or gas given off by the material is extracted from the chamber, at least some of that vapor or gas is compressed, and the compressed vapor or gas is passed through the heat exchanger, so that at least part of the latent heat of evaporation of the vapor or gas at the increased pressure is used to create the necessary temperature gradient between the heat exchanger and the atmosphere within the drying chamber, to cause the heat emission required for drying the material.

2 Claims, 13 Drawing Figures

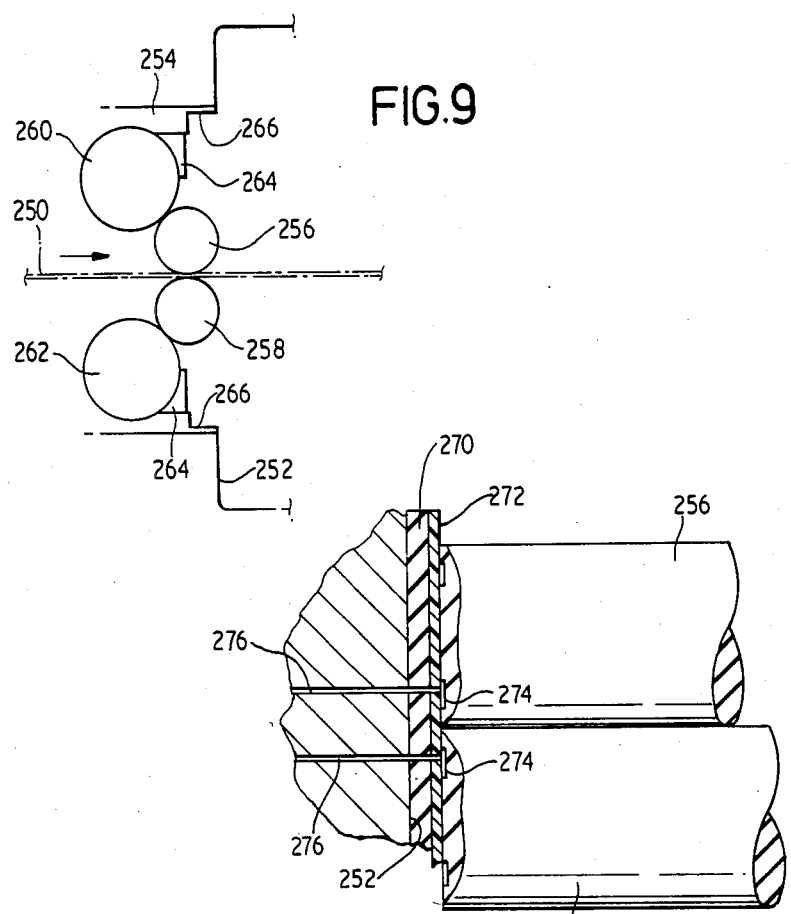
FIG.9
FIG.10
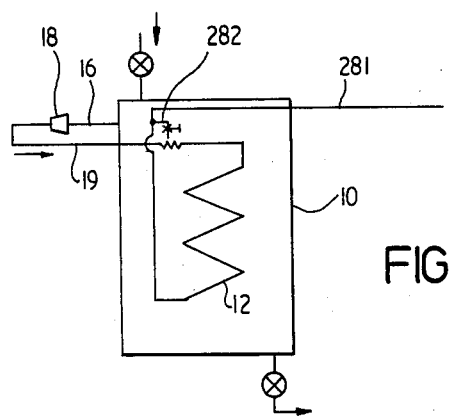
FIG.11.

A METHOD OF AND APPARATUS FOR DRYING MOISTURE CONTAINING MATERIAL

BACKGROUND TO THE INVENTION

The invention relates to the drying of moisture-containing materials, and although the invention is not restricted in its application to any particular type of material, it has been developed more especially for flexible sheet material such as fabric and paper or particulate material such as certain foodstuffs (e.g. grain, soya flour, coffee). Broadly, the invention can be used in any situation, where moisture can be removed from the material by the application of heat energy to the material. Consequently, the invention could be applied in some situations to the removal of moisture from a fluid.

The principal object of the invention is to improve the thermal efficiency of the drying process, thereby providing a means of reducing the energy consumption for a given reduction in moisture content of a given quantity of material.

When drying a moisture-containing material, it is usual to utilise one of two basic systems. The first system, which is very commonly used, can be termed the indirect drying method, wherein air, which is preferably heated, is passed over the material, and the moisture (or solvent) generally in the form of water vapour, is removed with the air stream.

The second drying system which is conventionally used, can be termed the direct contact system, and this method typically uses heated rollers, which contact a wet fabric or other material which is to be dried. The direct contact between the material and the heated rollers is arranged to produce an adequate increase in temperature of the material, sufficient to remove the moisture or solvent from the material which is to be dried.

In both the indirect and direct drying systems, external energy is generated to provide the air flow and/or the heat in the air or the rollers, and this energy is presented to the material which is to be dried. As a result, moisture leaves the material to be dried in the form of generated vapour, which contains the latent heat of evaporation, given up by the material to the moisture. Since the vapours given off by the material being dried contain the latent heat of evaporation which was required to convert them from a free liquid into a vapour or gas, then if those vapours are allowed to vent to atmosphere, this energy content is lost. A feature of the present invention is to provide an improved drying method and apparatus, by means of which at least part of the latent heat of evaporation of the vapour or gas produced in drying the material is re-utilised in the drying process.

In both the indirect and direct contact drying systems, the drying efficiency is greatly influenced by the amount of heat presented to the material which is to be dried, and it is necessary for this heat to be greater than the heat content of the moisture or solvent which is to be removed. Tests on conventional indirect drying systems usually show that the ratio of the heat energy which has to be supplied, to the energy of the moisture or solvents which are removed, is approximately 3:1. For the direct contact drying method, this ratio can be reduced to something in the order of 1.6:1. That is to say, in an indirect drying system, approximately 3000 B.T.U.s would be required to remove 1000 B.T.U.s in moisture or solvent, which is usually water, whereas in a direct drying system, 1600 B.T.U.s have to be supplied to remove solvent or moisture containing 1000 B.T.U.s heat energy. As will become more readily apparent below, it is a direct method that is desired in this invention, which means direct contact between the material and a solid heat transmitting medium or transmission of heat from a heat exchange located adjacent to the material.

It should be understood, that in any drying system, the basic requirements are (i) the creation of a temperature gradient so that the heat energy which is supplied flows to the moisture or solvent, and (ii) some method of effectively presenting the heat energy to the material which is to be dried. The present invention provides both a method and apparatus for fulfilling these basic requirements.

GENERAL FEATURES OF THE INVENTION

According to a first aspect of this invention, a method of drying moisture-containing material in a drying chamber, comprises: subjecting the material in the chamber to heat emitted by a heat exchanger, so that vapour or gas is given off by the material; preventing air from entering the chamber; extracting substantially air-free vapour or gas from the chamber; compressing at least some of the extracted vapour or gas in a compression system and passing the compressed vapour or gas through the heat exchanger whereby at least part of the latent heat of evarporation of the vapour or gas at the increased pressure is used to create the necessary temperature gradient between the heat exchanger and the atmosphere within the drying chamber to cause the heat emission for drying the material.

Although it is known to process the vapours or gases emitted from drying apparatus, the known form of processing which attempts to recover some of the latent heat of evaporation from the vapours or gases, generally only produces a very low heat content. Thus, one example of known apparatus which attempts this use of the vapours or gases from the drying apparatus is a heat wheel, and the heat recovered by this process is not adequate for re-utilisation in the drying process.

A further drying apparatus and method where energy is recovered from the vapour or gases produced by drying material is described in my co-pending United Kingdom Patent Application No.: 8014313, but the apparatus described in that specification is specifically limited to the utilisation of a vacuum system within the drying chamber, where the vapours or gases have to be first condensed before they can be re-utilised. In contradistinction to this, the method of the present invention does not require condensation of the vapours or gases from the drying chamber, and indeed the vapours or gases in the method according to the present invention are compressed and thereby raised to a higher temperature, before passing through the heat exchanger.

It has been found essential to prevent any substantial ingress of air into the drying chamber, and this is one of the important features of the invention. If air is allowed to enter the efficiency of the process is reduced, and as an increasing quantity of air will be mixed with the vapour or gas, the method would eventually become uneconomic or even totally ineffective.

It is preferred to generate vapour or gas in the drying chamber so as to give an internal pressure greater than that existing on the outside of the drying chamber. This of course, prevents air flowing into the chamber.

Preferably, at least some of any vapour or gas output from the heat exchanger is re-cycled through the compression system in addition to the vapour or gas being extracted from the drying chamber. Also, any condensate in the output from the heat exchanger is preferably separated from the vapour or gas, before the vapour or gas is re-cycled through the compression system. In one method, the condensate is passed through a heat pump, and the vapour or gas emission from the heat pump is re-cycled through the compression system. The vapour from the drying chamber may be passed through a vacuum pump. If a heat pump is utilised, then it is preferred that at least part of the vapour or gas emission from the heat pump is passed through the vacuum pump.

According to another preferred feature of this aspect of the invention, at least part of the vapour or gas output from the compression system is used to cause fluidisation of the material being dried and/or a particulate heat conducting medium within the chamber.

In one method in accordance with the invention, the material which is being dried is conveyed through the drying chamber from an inlet to an outlet thereof.

In a method of carrying out the invention, vapour or gas is generated in the drying chamber to given an internal pressure greater than that existing outside the drying chamber. This minimises the risk of air leaking into the drying chamber.

According to another aspect of the invention, apparatus for drying moisture-containing material comprises a drying chamber; a heat exchanger within or in communication with the interior of the drying chamber; means preventing air flowing into the drying chamber; extraction means for withdrawing vapour or gas from the interior of the drying chamber, and a compression system for vapour or gas withdrawn from the drying chamber, the output from the compression system being connected by first conduit means to the input side of the heat exchanger.

According to another preferred feature of the invention, the means preventing air flowing into the drying chamber includes vapour or gas generation means provided within or in communication with the drying chamber for producing a vapour or gas pressure within the drying chamber greater than that existing on the outside of the drying chamber. The vapour or gas generation means may comprise a liquid condensate bleed off a conduit from the heat exchanger onto an exposed surface of the heat exchanger within the drying chamber.

Preferably, there are second conduit means connecting the output of the heat exchanger with the input of the compression system, whereby there is provided a vapour or gas loop including the compression system and the heat exchanger.

According to a preferred feature of this aspect of the invention, means are provided for extracting liquid condensate from the vapour or gas leaving the heat exchanger. A heat pump may be provided connected between the means for extracting condensate and the input of the compression system, the heat pump being adapted to convert the liquid condensate into vapour or gas.

According to another preferred feature of the invention, the extraction means comprises a pump. The pump may take the form of a steam ejector, there being a conduit from the drying chamber to the reduced pressure region of the steam ejector. There may also be a conduit from the output of the heat pump to the inlet of the steam ejector, whereby at least part of the vapour or gas produced by the heat pump can be conveyed to the input of the steam ejector.

According to yet another preferred feature of the invention, the compression system comprises at least one axial or rotary element compressor.

It is preferred that the drying chamber is sealed against the ingress of air. Preferably, there is a vacuum lock chamber through which the material to be dried passes on its way into the drying chamber, the vacuum lock chamber having a sealed entrance and a sealed exit, the pump means for producing a reduced pressure being connected to the interior of the vacuum lock chamber. It is further preferred, that there is a vacuum lock chamber through which the dried material passes on its way out of the drying chamber, the vacuum lock chamber having a sealed entrance and a sealed exit, and pump means for producing a reduced pressure being connected to the interior of the vacuum lock chamber. For some types of materials which are to be dried, there may be a conveyor for carrying the material through the drying chamber in proximity to the heat exchanger. In one such apparatus, the conveyor comprises an auger within a tube for conveying particulate material through the tube. Preferably, the auger has a hollow shaft to which is connected the output from the compression system, so that the auger shaft comprises at least part of the heat exchanger. It is further preferred that the tube is jacketed and the output from the hollow shaft is connected to the interior of the jacket, whereby the tube comprises part of the heat exchanger. In a preferred construction, there is a plurality of similar augers, each in its tube, and arranged so that the material to be dried passes successively through the tubes.

According to yet another preferred feature of the invention, which is useful where discrete articles are to be dried, an endless band conveyor is provided within the drying chamber for carrying the material to be dried from an inlet position where the material falls onto the conveyor to an outlet position where it falls off the conveyor. Such a conveyor may be provided with transverse bars for assisting in conveying the material to be dried in the forward direction of the conveyor.

In another form of the invention, roller means are provided for traversing continuous sheet material to be dried through the drying chamber. There may be idler rollers within the drying chamber arranged so as to cause the material to be dried to follow a tortuous path within the chamber.

According to another feature of the invention, a flexible sheet conveyor is provided on which sheet material to be dried is carried within the drying chamber. Preferably, there are two flexible sheet conveyors arranged to follow the same path, so that the sheet material to be dried can be sandwiched between them.

According to another preferred feature of this aspect of the invention, means are provided for releasing some of the vapour or gas from the compression system into the drying chamber for agitating the material to be dried and/or an additional heat conducting particulate material in the drying chamber. When such additional particulate material is provided in the drying chamber, it is preferred that the arrangement is such that the vapour or gas from the compression system converts this particulate material into a fluidised bed, through which material to be dried passes. Preferably, the arrangement is such that the fluidised bed formed by the particulate material encompasses at least part of the heat exchanger. It is further preferred that control means are provided for regulating the flow of vapour or gas into the drying chamber, for controlling the degree of agitation of the material to be dried and/or the density of the fluidised bed.

In one arrangement, which is suitable for producing a fluidised bed of particulate material within the drying chamber, a porous tile is provided in the base or in a lower region of the wall of the drying chamber and a conduit leads from the compression system to the outside of this tile, so that the vapour or gas is released into the drying chamber in a dispersed form.

In a particular arrangement in accordance with this aspect of the invention, the compression system comprises a first compressor adapted to compress the vapour or gas extracted from the drying chamber to a pressure which is at least that required for fluidisation of the material to be dried or the additional particular material, and a second compressor adapted to compress vapour or gas from the first compressor to a higher pressure suitable for passing through the heat exchanger, there being a conduit from the first compressor to the second compressor and a further conduit from the output of the first compressor to the interior of the drying chamber.

In an alternative arrangement in accordance with this aspect of the invention, a steam ejector is connected between the output from the compression system and the interior of the drying chamber whereby the vapour or gas supplied to the drying chamber for agitating the material to be dried or the additional particulate material is at a lower pressure than the vapour or gas conveyed from the output of the compression system to the heat exchanger, and there is a conduit from the input side of the compression system to the low pressure region of the steam ejector.

The invention also comprises various detail arrangements, in particular sealing arrangements, for preventing the egress of vapour or gas or the ingress of air out of or into the drying chamber. These and other features of the invention, are described in the next section of this specification.

SPECIFIC EMBODIMENTS OF THE INVENTION

The invention in both its basic aspects, will be better understood, from the following specific examples of apparatus in accordance with the second aspect of the invention, and methods of operating the apparatus described in accordance with the first aspect of the invention. It should be understood, that the following specific embodiments are described by way of examples only, and with reference to the accompanying drawings, in which.

Figure 5:
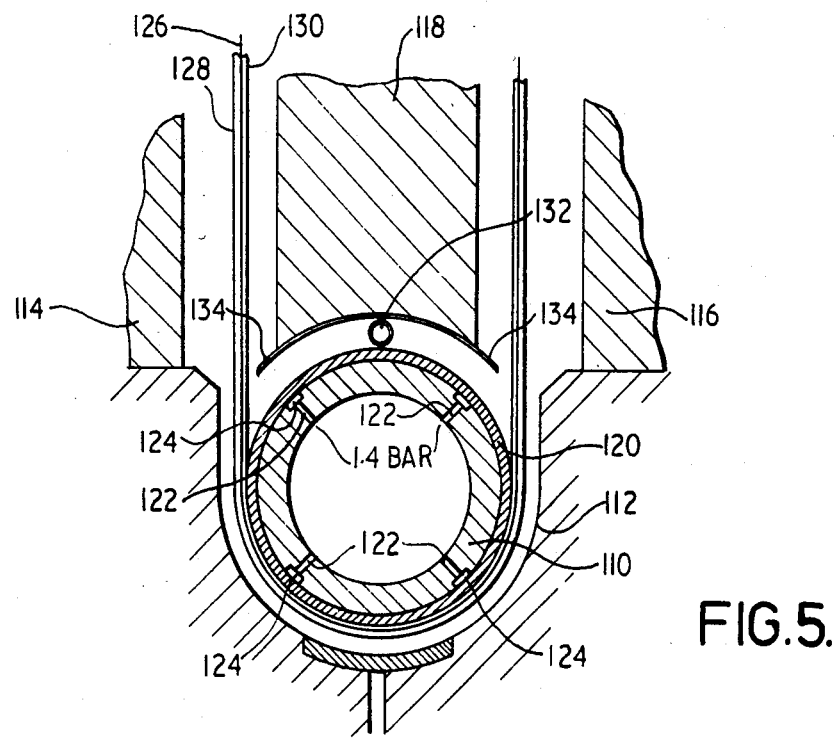
Figure 6:
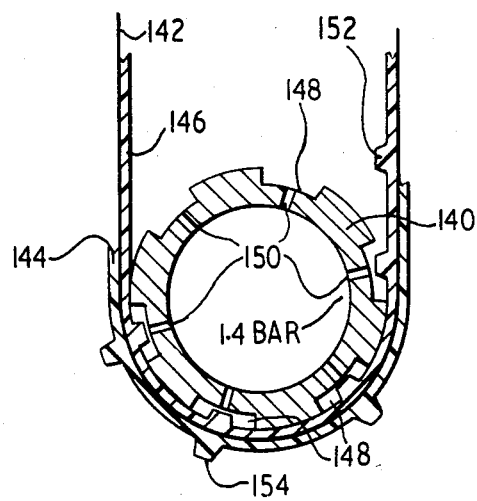
Figure 7:
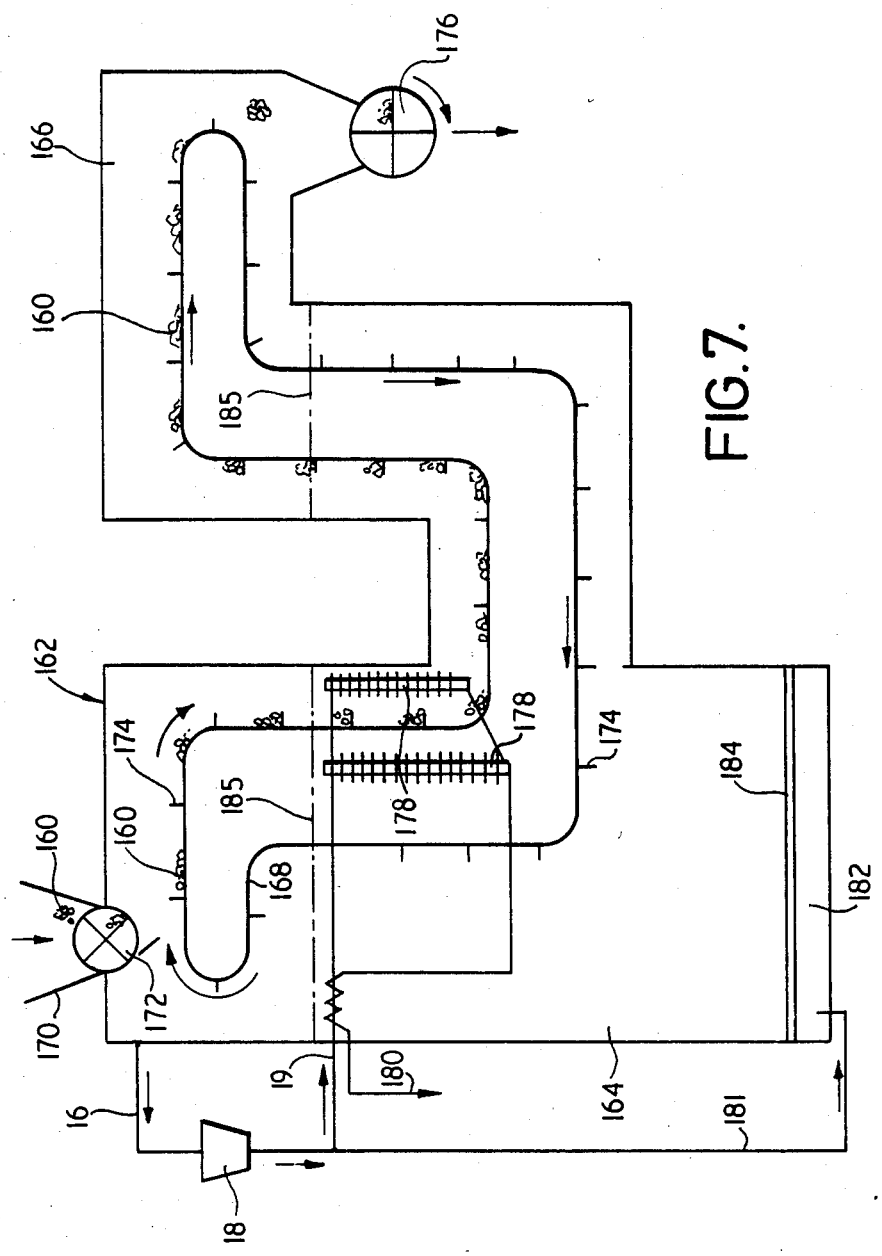
Figure 8:
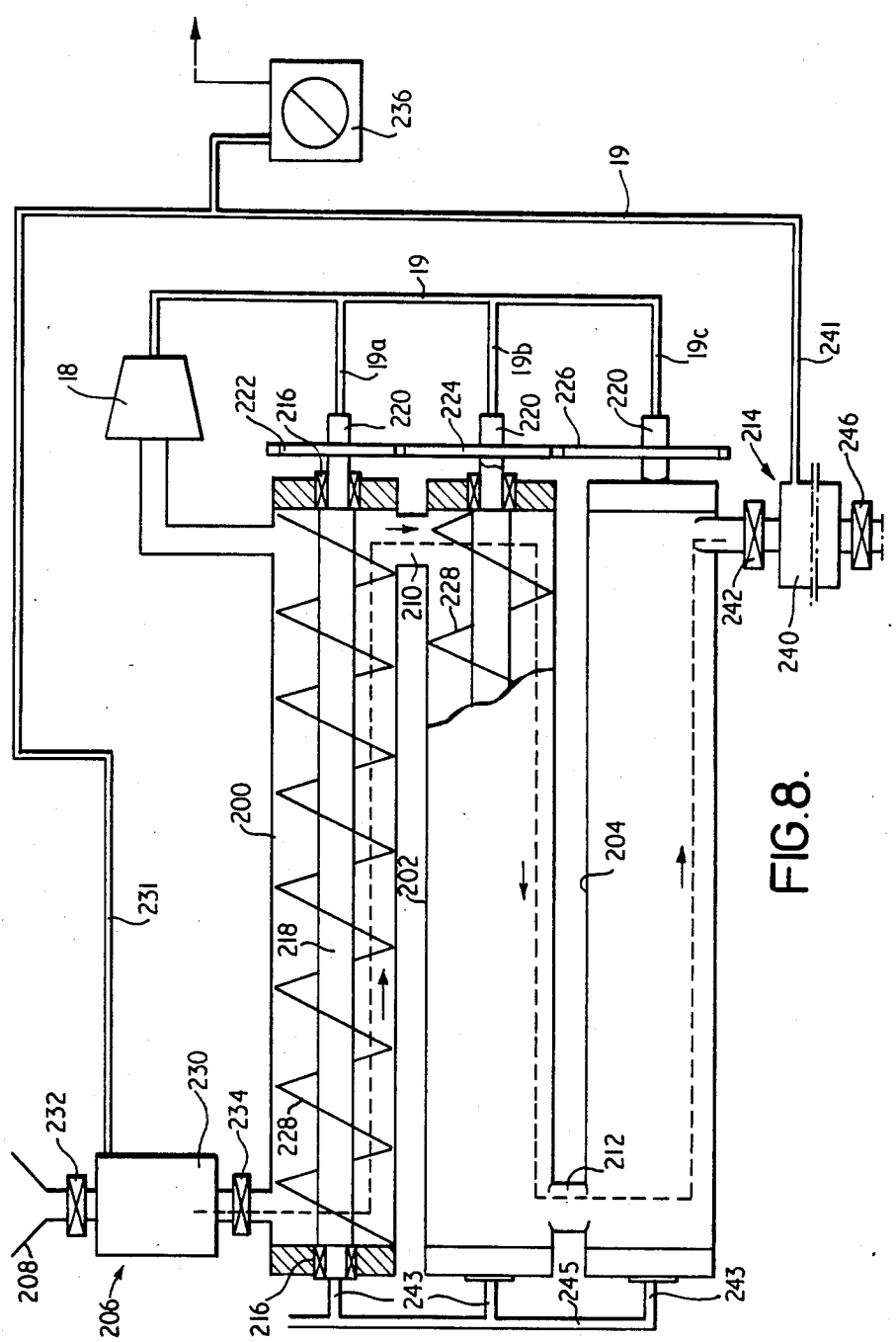
Figure 12:
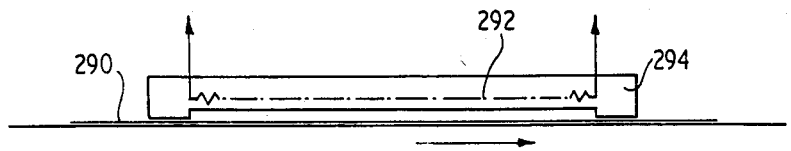
Figure 13:
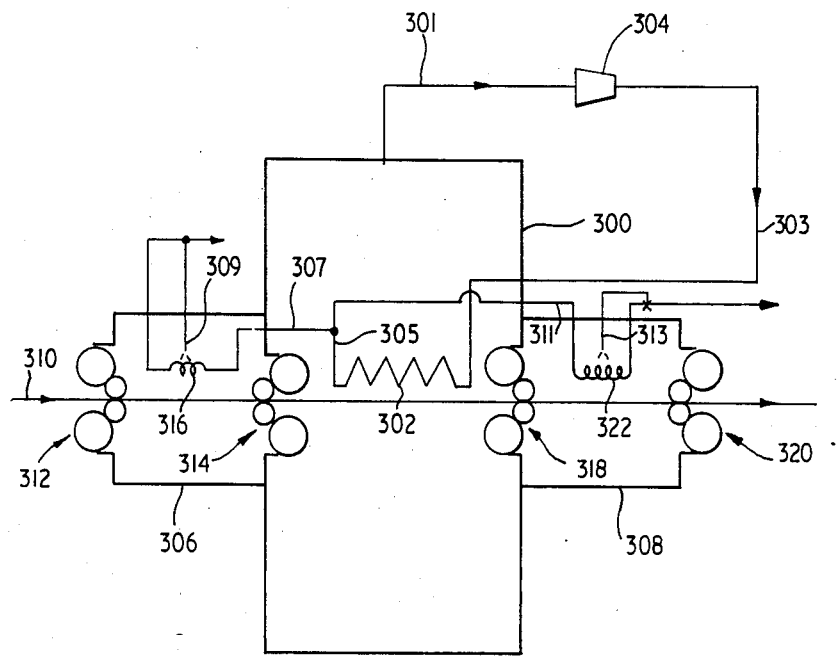

FIG. 5 shows a cross-section through a roller for use in another form of apparatus, FIG. 6 is a cross-section through an alternative construction of roller, FIG. 7 is a diagrammatic representation of a form of drying apparatus suitable for the drying of discrete articles, FIG. 8 is a diagrammatic part-sectional view through a form of drying apparatus suitable for use with particulate material, FIG. 9 is a diagrammatic end view of a sealing arrangement, FIG. 10 is a part sectional detail view of an end seal arrangement for a pair of rollers, FIG. 11 is a diagrammatic representation of a still further form of drying apparatus, FIG. 12 is a diagrammatic representation of a heat exchanger for use in certain forms of the drying apparatus, and FIG. 13 is a diagrammatic representation of drying apparatus incorporating means to prevent ingress of air.

Figure 1:
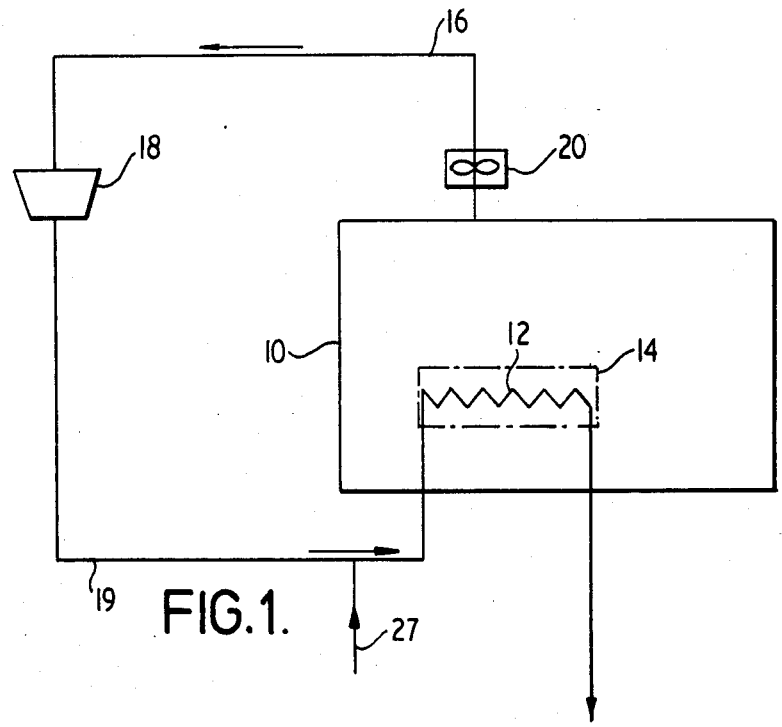
FIG. 1 is a diagrammatic representation of a first form of drying apparatus.

Referring to FIG. 1 of the drawings, a drying apparatus comprises a drying chamber 10, having a heat exchanger 12 mounted therein. It is to be understood that the expression "heat exchanger" used herein, is to be broadly interpreted, to include any form of apparatus through which heated fluid can be passed, for the purpose of giving up some of the heat from the fluid to the surrounding atmosphere within the drying chamber, or to any material which contacts the heat exchanger within the drying chamber. It will also be appreciated, that the heat exchanger, could be in a separate compartment or chamber in communication with the interior of the drying chamber 10, although generally speaking, it will be preferable to have the heat exchanger within the drying chamber itself, in order to bring the heat exchanger into the closest possible proximity to the material which is to be dried in the drying chamber. In this connection, the drying chamber 10 is adapted to receive a product indicated in chain dotted lines at 14, which is to be dried, and it is beneficial to the efficiency of the drying apparatus, for the drying chamber 10 to be substantially sealed to avoid losses of vapour or gas extracted from the product 14 during the drying process from the apparatus. Furthermore, sealing of the drying chamber 10 prevents the ingress of air into the drying chamber.

The drying chamber 10 is connected by a first conduit 16, to the inlet of a power driven axial flow compressor 18, and the outlet of the compressor 18 is connected via a second conduit 19 to the inlet end of the heat exchanger 12. A fan or other extraction device 20, is mounted in the first conduit 16, to facilitate the extraction of vapour or gas emitted by the product 14 during the drying process, from the chamber 10, but it is to be understood, that the provision of the fan or extraction device 20 is optional.

It will be appreciated, that the apparatus shown diagrammatically in FIG. 1 represents only a basic circuit, for drying, whereby the vapour or gas extracted from the product 14 is contained within the system and passes via the first conduit 16 to the compressor 18. Assuming that the apparatus illustrated in FIG. 1 is working with atmospheric pressure within the drying chamber 10, then providing there is a sufficient temperature gradient between the heat exchanger 12, and the material 14 which is being dried, heat will be given off by the heat exchanger, and a large proportion of this heat will be absorbed by the material being dried. As a result, some of the moisture contained within the material 14 will be converted from free liquid into vapour or gas, and the latent heat of evaporation of this moisture will be given up to the vapour or gas. Consequently, the drying chamber 10 becomes filled with vapour or gas. This vapour or gas is then extracted by the fan 20, and is compressed as it passes through the compressor 18. As a result of this compression, the temperature of the vapour or gas is increased in accordance with the Gas Laws. The high temperature vapour or gas then passes into the heat exchanger 12 within the chamber 10, and at least some of the heat in the vapour or gas passing through the heat exchanger is given up to the material 14. The actual arrangement of the heat exchanger 12 relatively to the material within the drying chamber 14 may be such as to produce direct contact drying or drying by transmission of heat from heat exchanger 12 located adjacent to the material.

In order to produce the maximum heat exchange from the heat exchanger to the material being dried, the vapour or gas should be condensed within the heat exchanger 12, and leave the system in the form of a condensate. This results in the giving up of the entire latent heat of evaporation of the moisture within the heat exchanger, and theoretically, one then has a perfect heat cycle. In practice of course, there will be heat losses within the system, and these have to be made up by the addition of energy at the compressor 18, and possibly by the addition of further direct heat through some form of heater within the heat exchanger.

If condensate is formed as a result of the passage of the vapour or gas through the heat exchanger 12, this condensate may itself be used for ancillary processing.

Figure 2:
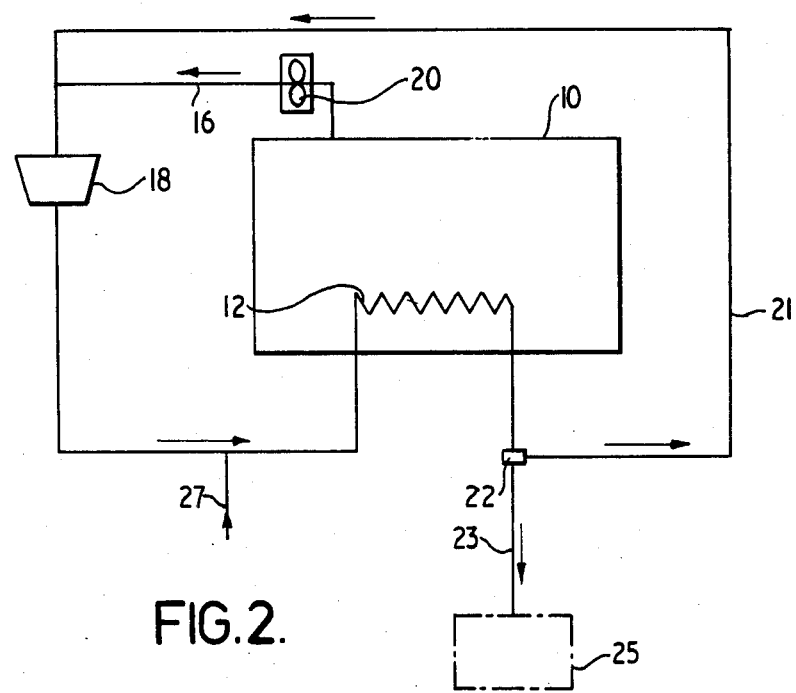
FIG. 2 is a diagrammatic representation of a modified form of drying apparatus.

Turning now to FIG. 2, there is illustrated a drying apparatus which is quite similar to that shown in FIG. 1, and the various components of this drying apparatus which are identical to components described with reference to FIG. 1, have been allocated the same reference numerals. In this modified drying apparatus, the output from the heat exchanger 12, is connected to a separation device 22 (such as a steam trap) for separating the condensed liquid from the vapour or gas. A conduit 21 leads from the separation device 22 to the input side of the compressor 18, and this conduit is adapted to convey vapour or gas from the device 22 to the compressor, to be mixed with the vapour or gas extracted from the drying chamber 10 by the fan 20. The free liquid portion of the condensate from the separation device 22 passes through a conduit 23 to a heat pump indicated diagrammatically at 25. At the heat pump 25, the liquid condensate from the heat exchanger is reconverted into heated vapour and cooled liquid condensate. The vapour can be fed to the compressor 18, whereby the heat extracted from the condensate is also used in the heat exchanger. Alternatively, the condensate from the separation device 22, can be used directly as boiler feed water, where due to its relatively high temperature, it reduces the cost of raising steam in the boiler.

FIG. 2 also illustrates the possibility of an additional primary feed of vapour or steam through an inlet 27 connected between the output side of the compressor 18, and the input side of the heat exchanger 12. Such an additional primary feed may be required, where the heat losses in the system are such, that it would be impossible to sustain the drying process merely by the use of the vapour or gas from the compressor 18 or for the priming of the system. The primary feed via the inlet 27 may in fact be steam generated in a boiler using the condensate from the separatation device 22 as the boiler feed water. Where the material 14 which is being dried is to have water extracted from it, it will be appreciated that water vapour is being constantly added to the system, and the excess has to be removed at some point, for example in the form of liquid condensate, but the remaining vapour or gas, with its latent heat of evaporation content, is always returned to the inlet side of the compressor 18, so that the maximum possible heat is extracted from the vapour or gas at the heat exchanger 12.

Figure 3:
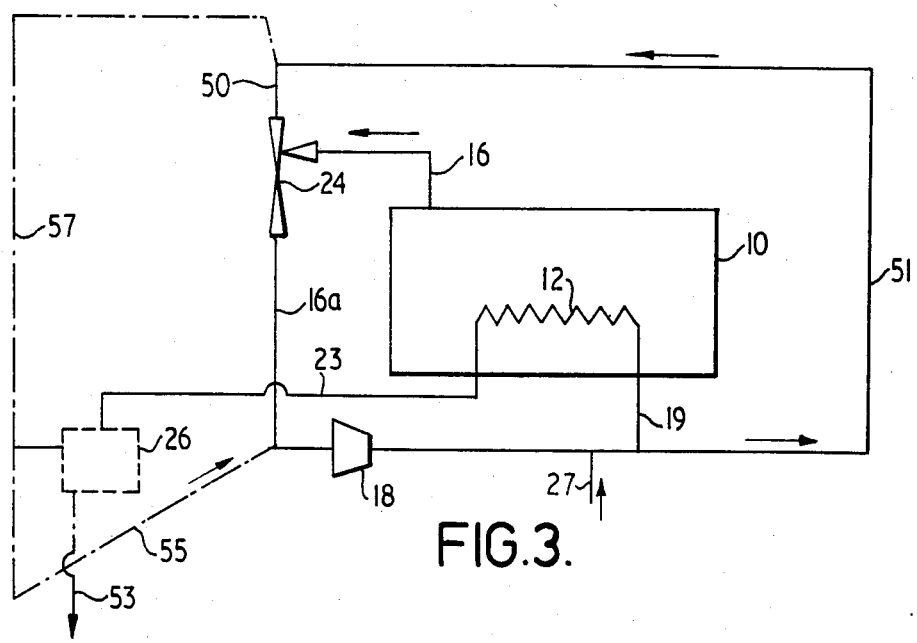
FIG. 3 is a diagrammatic representation of a further modified drying apparatus.

In FIG. 3, a more refined form of the invention is illustrated, although once again, those components which are identical or equivalent to components of the drying apparatus described above with reference to FIG. 1 are again allocated the same reference numerals. In this arrangement, the drying chamber 10 is arranged to be capable of sustaining a vacuum therein, that is to say it is sealed against the ingress of air, so that the drying apparatus can be operated at a reduced pressure. In this arrangement, instead of the fan 20 for extracting vapour or gas from the drying chamber 10, a steam ejector 24 is utilised. Such steam ejectors are conventionally used in vacuum apparatus, and essentially, it comprises a Venturi arrangement, through which steam is fed from a supply pipe 50, and as this steam passes through the Venturi, there is a region of reduced pressure within the ejector. The first conduit 16 from the drying chamber 10 is connected to the region of reduced pressure of the steam ejector, and hence, the ejector acts as a vacuum pump, for the purpose of sucking vapour or gas from the interior of the drying chamber.

It will be appreciated, that the steam ejector 24 is capable of producing a significant vacuum (i.e. pressure lower than atmospheric pressure) within the drying chamber 10, and one of the advantages of this, is that the boiling point of the moisture contained within the material to be dried falls with the reduction in pressure. Consequently, the effectiveness of the moisture removal process is enhanced. Of course, it is necessary to supply energy in the form of steam through the supply pipe or inlet conduit 50 in order to obtain this additional extraction of moisture, vapour or gas from the material being dried.

The output from the steam ejector 24 passes through a conduit 16a to the input side of the compressor 18, annd from thence, the compressed vapour or gas passes through the secondary conduit 19 to the input side of the heat exchanger 12. The vapour or gas which is thus supplied to the heat exchanger, will comprise not only the vapour or gas extracted via the first conduit 16, from the drying chamber, but also the steam supplied through the inlet pipe 50 to the steam ejector 24.

There is a further conduit 51 taken from the conduit 19, and leading to the inlet conduit 50. The purpose of this conduit 51 is to lead some of the vapour or gas from the compressor 18, to the inlet side of the steam ejector 24. Theoretically, it would be possible for the steam ejector, to be self-sustaining, because the compressor 18 could be used to raise the vapour or gas to the pressure required for operating the steam ejector 24. In practice of course, it will always be necessary to apply additional energy via the compressor 18, and it may also be necessary to supply primary feed vapour to the steam ejector 24.

Referring again to FIG. 3, it is assumed that the output from the heat exchanger 12 is in the form of free liquid condensate, which passes through a conduit 23 to a heat pump 26. In practice, it may be necessary to provide a separation device such as a steam trap, so that only liquid condensate is supplied to the heat pump 26, any vapour content of the output from the heat exchanger being fed back into the first conduit 16, for recycling through the vapour or gas circuit.

The relatively cool water from the heat pump 26 passes out through a conduit 53 to a reservoir (not shown) and this water may be used as feed water for a boiler. The heated vapour or gas output from the heat pump 26 is divided between two conduits 55 and 57. The conduit 55 leads to the input side of the compressor 18, so that the vapour passing through this conduit rejoins the vapour or gas cycle of the apparatus. The vapour or gas output from the heat pump 26 which passes through the conduit 57 enters the steam ejector 24 through the inlet conduit 50.

It will be observed, that the essential feature of the drying apparatus described with reference to FIG. 1, FIG. 2 or FIG. 3 of the drawings, is the compressor 18, which in the specific examples, has been described as an axial flow compressor. It will be appreciated, that any form of vapour or gas compressor can be used, provided it will give the necessary increase in temperature of the vapour or gas, to enable that vapour or gas to be reutilised in the heat exchanger 12. In other words, the temperature of the vapour or gas from the compressor 18, must be such as to give the necessary temperature gradient between the heat exchanger and the material which is to be dried. Furthermore, it will be appreciated that the use of a heat pump such as that shown in FIG. 2 at 25 or that shown in FIG. 3 at 26 can be utilised to supplement the action of the compressor 18, in order to obtain maximum thermal efficiency of the drying apparatus.

It will also be appreciated, that the use of the apparatus illustrated in any one of FIGS. 1 to 3, makes it possible to take vapour or gas at a low pressure, from the drying chamber 10, thus reducing the structural problems involved in the manufacture of the drying chamber 10, and to increase the vapour or gas pressure by means of the compressor 18, so that the relatively high pressures in the system are confined to the portion thereof between the compressor 18 and the heat exchanger 12 (that is to say the second conduit 19). In order to make the drying apparatus as effective as possible, the drying chamber 10 is sealed in a manner to ensure that the vapour or gas evolved during the drying process is retained within the apparatus. By retaining the vapour or gas within the apparatus, the entire latent heat of evaporation of the vapour or gas is theoretically available for use in the heat exchanger.

Figure 4:
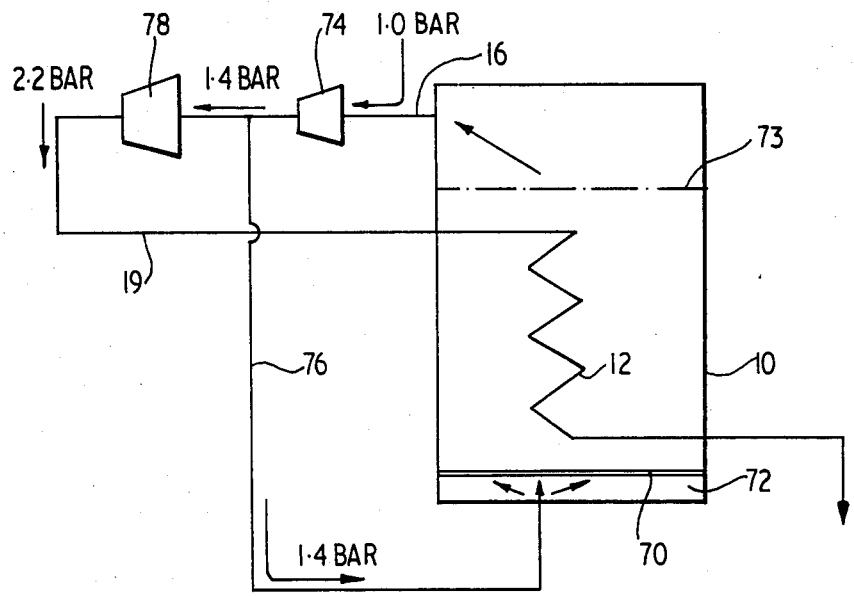
FIG. 4 is a diagrammatic representation of another form of drying apparatus.

In FIG. 4, there is a drying chamber 10 provided with a heat exchanger 12, and with a perforated false floor 70, there being thus provided a plenum chamber 72 below the false floor. The chamber 10 is adapted for the inlet and egress of material to be dried, and the particular form of the inlet and exit openings will be determined by the type of material which is being dried, and whether the material is of a discrete or continuous nature. For present purposes, it is unnecessary to describe the inlet and exit arrangements of the drying chamber. Particulate heat conducting material is provided in the chamber, so that it is possible to provide a fluidised bed of this material, the level of the bed under fluidisation being indicated by the line 73.

Vapour or gas emitted from the material being dried within the chamber 10 is extracted from the chamber via the usual first conduit 16, which leads to a first axial flow compressor 74. The output side of the compressor 74 is connected through a conduit 76 to the plenum chamber 72, and this provides the vapour or gas required for the fluidisation of the particulate heat conducting material contained within the chamber. The output from the compressor 74 is also supplied to the inlet of a second compressor 78, from which the second conduit 19 leads to the inlet of the heat exchanger 12. In other words, the two compressors 74 and 78 can be regarded as being in series, so far as the supply of vapour or gas to the heat exchanger is concerned.

It is assumed that the output from the heat exchanger 12 will be in the form of condensate, although it may be necessary to fit separation means for the purpose of dividing liquid condensate from vapour, and the liquid condensate and/or the vapour can be recycled as described with reference to FIGS. 2 and 3.

It can be assumed that the vapour or gas from the drying chamber 10, will arrive at the first compressor 74 at a pressure approximately that of the atmosphere (i.e. 1.0 BAR) although, if an extractor fan similar to that shown at 20 in FIGS. 1 and 2 is fitted, the pressure may be very slightly above 1.0 BAR when it arrives at the compressor 74. The output from the compressor 74 in this particular example is 1.4 BAR, and hence the pressure of the vapour or gas arriving in the plenum chamber 72 is at 1.4 BAR, which is adequate for the fluidisation of the particulate heat conducting material in the chamber. The output from the second compressor 78 is approximately 2.2 BAR, and this is a more reasonable pressure for vapour or gas to be utilised in the heat exchanger 12.

Where the material which is to be dried does not lend itself to fluidic action, an additional heat conducting material can be introduced into the chamber 10. This additional heat conducting material can be particles of various forms of material which flow freely, such as, for example, glass beads, and it may be necessary to introduce this additional heat conducting material, where the material which is to be dried is of large volume and/or density.

When an additional particulate heat conducting material is introduced into the chamber 10, the vapour or gas released from the material being dried together with any vapour or gas supplied through the floor 70, will cause the particulate material to move within the zone of the drying chamber which contains the material to be dried. This movement of the particulate material relatively to the heat exchanger causes that material to be heated, and this in turn gives up its heat to the material which is being dried. In other words, the fluidised particulate material is utilised to provide a form of conduction of heat from the heat exchanger to the material being dried, (according to fluid bed theory) and this greatly enhances the drying operation, partucularly with certain products such as paper or fabric.

Where the material which is being dried can itself be fluidised, then the use of an additional particulate heat conducting material such as glass beads, can still be desirable, and there are instances, where such a fluidised system could be used to advantage. The separation of the particles of the heat conducting material from the material to be dried can be effected after drying by classification of the different particles in accordance with their density, or some other known means could be utilised, for example vibrating the products or passing them through a cyclone, to effect separation thereof.

The utilisation of the vapours or gases evolved from the material to be dried, for the purpose of fluidising additional particulate material used in the drying process, has previously been described in my co-pending British Patent Application No. 8014313, but in that system, an essential feature is that the vapour or gas is generated at low temperature in a vacuum chamber (i.e. a chamber wherein the pressure is lower than atmospheric pressure) whereas the drying apparatus which is the subject of the present invention can be operated at any pressure level, and allows of much higher heat exchanger temperatures and temperature gradients between the heat exchanger and the material to be dried.

It will be appreciated, that any of the drying apparatus illustrated in FIGS. 1 to 4 could be used for the continuous drying of a material, such as for example, paper or textile fabric. In that case, the chamber is provided with an inlet and outlet, through which material in sheet form such as paper or fabric, can enter and leave the drying chamber. Additionally, there are idler rollers provided within the drying chamber, around which the material to be dried passes. In other words, the idler rollers compel the continuous material which is being dried to follow a tortuous path in relatively close proximity to the heat exchanger. With this kind of material to be dried, the heat exchanger may be formed by coils or it may be constituted by a series of parallel horizontal pipes, extending between vertical manifold pipes at the ends of the horizontal runs. In fact, any configuration of the heat exchanger pipes may be utilised, as long as it provides heating surfaces in reasonably close proximity to the path of the continuous material which is to be dried.

When an idler roller arrangement is employed, care has to be taken to ensure that solid particles of the heat conducting material used for fluidisation (e.g. Ballotini) do not become trapped between one of the rollers and the material which is being dried. A method by which this can be achieved is illustrated in FIG. 5. A roller 110 is illustrated, and this is disposed in a recessed portion 112 of the drying chamber. In the particular arrangement which is illustrated in FIG. 5, there are two fixed heat exchangers 114 and 116 mounted one on each side of the recess 112, and a removable central heat exchanger 118. Compressed vapour or gas is supplied to these three heat exchangers from a compression system such as that described with reference to one of the preceding Figures, and the particular method by which the heat is supplied to the heat exchangers is not relevant to the arrangement illustrated in FIG. 5. The roller 110 is hollow, and at one end, there is provision for supplying vapour or gas under pressure into the hollow roller 110. The interior of the roller is fed with vapour or gas at a pressure similar to that used for fluidisation of particulate heat conducting material—say approximately 1.4 BAR. The roller 110 is fitted with a sleeve 120 which is a tight fit on the hollow roller 110, and which is itself made of porous material. Furthermore, a series of radial holes 122 is formed in the wall of the hollow roller 110, each of these holes 122 communicating on the outside with a longitudinally extending recess 124 formed in the roller. Hence, these longitudinally extending recesses 124 are closed on the outside by the porous sleeve 120. When vapour or gas under pressure is supplied through the hollow shaft 110, it passes out through the radial holes 122, then through the longitudinally extending recesses 124, and thence through the porous sleeve 120.

As illustrated in FIG. 5, continuous length flexible sheet material 126 which is being dried is sandwiched between two carrier bands or fabrics 128 and 130. Consequently, the inner carrier band 130 engages with the periphery of the porous sleeve 120 on the roller 110. Because vapour or gas under pressure is constantly escaping through the porous sleeve 120, any particulate material which tends to enter the nip between the inner carrier band 130 and the porous sleeve 120, will be blown away by the escaping vapour or gas. Hence, it is very unlikely that any particulate material will become trapped between the material which is being dried, and the roller 110.

FIG. 5 also illustrates another method whereby particulate material is prevented from entering the nip between the inner carrier band 30 and the roller 110. A sparge pipe 132 is located along the length of the roller 110, in close proximity to the zenith of that roller. This sparge pipe is fed with water, and in fact this may be condensate water from the heat exchanger. The water flowing through the sparge pipe is allowed to flow out through a series of fine holes, which project it upwardly, into engagement with a face of the removable heat exchanger 118. As a result, water vapour is flashed off from that face of the heat exchanger, and this provides vapour travelling at a velocity high enough to contribute towards and sustain fluidisation of the particulate heat conducting material in the region of the heat exchangers 114, 116 and 118. At the same time, the velocity of the vapour given off by the engagement of the water with the face of the removable heat exchanger, is sufficient to blow particulate material away from the region where the inner carrier band 130 forms a nip with the roller 110. A suitably profiled deflector plate 134 may be provided at each side of the removable heat exchanger, for the purpose of directing the vapour produced by the sparge pipe, towards the nip of the carrier band 130 and the roller 110.

Turning now to FIG. 6, a roller arrangement is illustrated, which can be used in a similar situation to that shown in FIG. 5. In this arrangement, a hollow roller 140 is provided, and the continuous sheet material 142 which is to be dried is sandwiched between two flexible carrier bands 144 and 146. In this case, the roller 140 is not provided with an outer porous sleeve, but it is formed with a series of longitudinally extending recesses 148 each of which communicates with the interior of the hollow roller 140 through a plurality of radial holes 150. The carrier band 146 which at this position is on the inside, engages directly on the periphery of the roller 140, and it may be formed with internal teeth 152 which mesh with the recesses 148, for the purpose of providing a positive drive from the roller 140, to the inner carrier band 146. In addition, vapour or gas under pressure is supplied to the interior of the hollow roller 140, and this vapour or gas escaping through the radial holes 150 into the longitudinally extending recesses 148 blows outwardly, to prevent any particulate material from being trapped between the nip of the inner carrier band 146 and the roller 140.

Moreover, the outer carrier band 144 may be formed with outwardly projecting teeth 154, which assist in agitation of the particulate heat conducting material. These teeth are particularly useful, in disturbing particulate material which might tend to accumulate under the roller 140.

The carrier bands 128, 130, 144 and 146 illustrated in FIGS. 5 and 6, could be made of open mesh material such as wire, which allows the particulate heat conducting material to make contact with the material which is being dried, providing that the mechanical bombardment effect of the particulate material is not detrimental to the material which is being dried. However, in many cases, for example paper drying, it may be preferable to make the carrier bands 126, 130, 144 and 146 of such a fine mesh, as to ensure that the particulate heat conducting material does not make contact with the material being dried. The carrier bands themselves may be made of material having good heat transfer characteristics, for example phosphor bronze. A phosphor bronze type carrier band does not expand or contract at the same rate as the material being dried, which ensures a form of "slip" between the faces of the material which is being dried and the mating faces of the carrier bands, and this can be advantageous, in that it gives a "polish" to the faces of the material being dried.

In FIG. 7, there is illustrated an arrangement suitable for the drying of discrete relatively large items which are indicated diagrammatically at 160. These items may be of irregular shape, for example they could be certain kinds of foodstuff items. In this arrangement, a drying chamber 162 is provided which essentially comprises a main vertical chamber 164 and a Z-shaped extension 166. A series of idler rollers (not shown) arranged within the drying chamber 162 supports an endless band conveyor 168, which by virtue of the idler roller arrangement, follows a path which is generally U-shaped, with two short horizontal extensions at the upper ends of the vertical limbs of the U.

A hopper 170 is provided above the main vertical portion 164 of the drying chamber, and this hopper is provided with a rotary valve 172, whereby items stored in the hopper can be fed one at a time on to the left-hand horizontal upper run of the conveyor 168. The conveyor may be provided with a series of outwardly extending bars 174 which are used to push the articles 160 to be dried along the horizontal runs of the conveyor. Effectively, these bars 174 divide the length of the conveyor into a series of pockets, each of which is adapted to receive one of the articles 160 which are to be dried. Moreover, the speed of travel of the conveyor 168 is so related to the rotation of the valve 172, that a single article to be dried is allowed to drop into each of the pockets on the conveyor. An outlet rotary valve 176 is provided beneath the right-hand horizontal limb of the conveyor and this is adapted to operate in similar fashion to the inlet rotary valve 172.

During operation of the drying apparatus, individual items for drying are dropped through the rotary valve 172 into pockets on the conveyor 168. They are then carried through a U-shaped path determined by the conveyor, and dropped off the right-hand end, where they are allowed to escape from the drying chamber 162 through the rotary valve 176. The two rotary valves ensure that as far as practicable, the interior of the drying chamber 162 is sealed against the escape of vapour or gas, or the ingress of air.

The drying chamber is provided with a vapour or gas cycle arrangement similar to one of the arrangements described with reference to the preceding drawings. As illustrated, there is a first conduit 16 leading from the upper portion of the main vertical section 164 of the drying chamber to the input side of a compressor 18. Hence, vapour or gas extracted from the drying chamber is supplied to the compressor. Part of the output vapour or gas from the compressor 18 is supplied via the conduit 19 to the heat exchanger 178. As shown in FIG. 7, the heat exchanger preferably includes vertical sections closely adjacent to vertical runs of the conveyor 168, within the main portion 164 of the drying chamber. Condensate from the heat exchanger is allowed to flow out through a conduit 180, although this condensate may be utilised as previously described. The remaining part of the vapour or gas output from the compressor 18 is taken via a conduit 181 to a plenum chamber 182 beneath a perforated false floor 184 within the main portion of the drying chamber. A bed of particulate heat conductive material such as small glass beads, sand or Ballotini is provided on the floor 184, so that when vapour or gas is supplied through the conduit 181, this particulate material is fluidised within the drying chamber 162. If the fluidisation is sufficiently effective, the fluid bed will rise to a level indicated by the line 185 in both the main vertical portion 164 and the Z-shaped section 166 of the drying chamber. It will be noted, that in the lower portion of the U-shaped path of the articles to be dried, they pass through the fluidised bed, as well as in close proximity to parts of the heat exchanger 178. Consequently, there is a good transfer of heat from the heat exchanger, to the items 160 which are to be dried.

The invention is well adapted for the drying of granular material such as grain, coffee, soya flour and the like, and a specific form of apparatus for this purpose is illustrated in FIG. 8. The apparatus essentially comprises a series of three tubes 200, 202, and 204 in a side-by-side arrangement. Each of these tubes 200, 202, and 204 is in fact jacketed, so that there is a circumferencial liquid chamber around each of the tubes. (For simplicity of illustration, the jackets have been omitted from FIG. 8). At the left-hand end of the upper tube 200, there is a material inlet 206, leading from a hoper 208 in which the granular product to be dried can be stored into the upper tube 200. The inlet arrangement 206 will be described in greater detail later. At the right-hand end of the tubes, there is an interconnection 210 between the interior of the tube 200 and the interior of the tube 202, and similarly at the left-hand end, there is an interconnection 212 between the interior of the tube 202 and the interior of the tube 204. At the right hand end of the tube 204, there is an exit arrangement 214 through which the granular product to be dried can escape from the drying apparatus, and this exit arrangement will also be described in greater detail later.

Each of the tubes 200, 202, and 204 is provided with roller bearings 216 at each end, and a hollow shaft 218 is journalled in these bearings. At the right-hand end, each of the shafts 218 has an extension 220 on which is keyed a driving gear 222, 224 or 226. The three driving gears mesh with each other, and there is a mechanical drive arrangement (not shown) for causing rotation of the driving gears, and hence rotation of the hollow shafts 218.

Each of the hollow shafts 218 is fitted with a stainless steel helical auger 228, and the direction of rotation of the shafts, is such that granular product being fed in through the inlet arrangement 206 at the left-hand end of the upper auger 228 is traversed by that auger 228 to the right-hand end of the tube 200, where it can fall through the connection 210 into the right-hand end of the tube 202. Now because the gear wheels 222 and 224 mesh with each other, the auger 228 in the tube 202 rotates in the opposite direction to that in the tube 200, so that the granular product is then conveyed towards the left-hand end of the tube 202, where it falls through the connection 212, into the tube 204. The auger 228 in the tube 204 rotates in the same direction as that in the tube 200, and conveys the granular product, to the right-hand end of the tube 204, where it is able to fall out through the exit arrangement 214. There is thus provided a continuous path for the granular material, along a tortuous path through the three tubes 200, 202, and 204.

The tubes 200, 202, and 204 effectively form a single drying chamber. Now if air mixes with the vapour generated in the drying chamber, this reduces the drying efficiency of the apparatus, and the special inlet arrangement 206 and exit arrangement 214 are designed to prevent ingress of atmospheric air as far as possible. Thus, the inlet arrangement comprises a small intermediate chamber 230 fitted with two valves 232 and 234. These two valves are of a type which will allow the granular product to pass therethrough, the valve 232 being fitted between the hopper 208 and the intermediate chamber 230 and the valve 234 being fitted between the intermediate chamber 230 and the left-hand end of the tube 200. Additionally, there is a conduit 231 leading from the interior of the intermediate chamber 230, to a power driven liquid ring pump 236. This pump is driven in such a manner as to extract air from the intermediate chamber 230.

The inlet arrangement 206 is preferably arranged for automatic operation of the valves 232 and 234 in order to provide the following sequence of operations: First the valve 234 is closed, and the valve 232 opened to allow the granular product to feed into the intermediate chamber 230, until that chamber is practically full. Then the valve 232 is closed, but because the liquid pump 236 is operating, air is extracted from the intermediate chamber 230, which consequently is at a lower pressure than atmospheric pressure. Then the valve 234 is opened, and whilst this allows the granular product to fall from the intermediate chamber 230 into the left-hand end of the tube 200, it also connects the interior of the tube 200 (and therefore the interiors of the tubes 202 and 204) with the liquid ring pump 236. As a result, air and vapour or gas in the effective drying chamber are sucked outwardly, thus preventing the ingress of air into the drying chamber. The cycle can then be repeated.

Turning to the exit arrangement 214, this also comprises an intermediate chamber 240 with valves 242 and 246 in a similar arrangement to that of the inlet arrangement 206. Furthermore, a conduit 241 connects the interior of the intermediate chamber 240 with the power driven liquid ring pump 236. The sequence of operations of the exit arrangement 214 is as follows: First the valve 246 is closed and the valve 242 is opened allowing the granular material to fall into the intermediate chamber 240 until that chamber is almost full. The interior of the chamber 240 is being constantly evacuated by the operation of the liquid ring pump 236, and hence whilst the valve 242 is opened, air and vapour or gas is also extracted from the tube 204 (and therefore also from the tubes 202 and 200), thus providing the ingress of air into the effective drying chamber formed by the three tubes. The valve 242 is then closed, and valve 246 opened, allowing the dried granular product to fall out of the exit arrangement 214.

A conduit 16 leads from the right-hand end of the tube 200 to a compressor 18, and the output from the compressor 18 flows via a manifold conduit 19 and a series of three conduits 19a, 19b and 19c into the shafts 218, which are hollow. At the left-hand end of each shaft 218, there is an exit conduit 243 leading to a condensate manifold 245. Compressed vapour at a relatively elevated temperature (for example 150° C.) passing through the shafts 218 heats those shafts, which in turn heat the stainless steel augers 228. Consequently, the shaft 218 with their respective augers 228 form the heat exchangers, and it will be noted that in this arrangement, each heat exchanger substantially fills the cross-section of its drying chamber, and extends throughout the length of the drying chamber. Moreover, there is intimate contact between the auger 228 and the shaft 218 on the one hand, and the granular material which is being dried on the other hand, so that this can be regarded as an instance of direct contact drying.

The condensate leaving the auger shafts 218 via the condensate conduit 245 can be used as feed water for a boiler, or it can be passed through a separator and divided into vapour and condensate as previously described, or it can be fed to the hollow jackets of the tubes 200, 202, and 204, and used in this way to supplement the drying effect of the heat exchangers. This arrangement illustrated in FIG. 8, provides a particularly efficient method of drying granular material.

It has already been explained that the material to be dried, may be in continuous web form, a typical instance being paper. Where material in continuous form is fed into and out of the drying chamber, it is necessary to ensure that the inlet and exit arrangements are as fluid-tight as possible, in order to prevent either the escape of vapour or gas from the interior of the drying chamber, where the interior of the chamber is at a pressure greater than atmospheric pressure, or to prevent the ingress of air, where the interior of the chamber is at lower than atmospheric pressure. A suitable sealing arrangement for use either at the inlet or exit, is illustrated in FIG. 9.

The web-like material which is to be dried is indicated in FIG. 9 at 250, and part of the drying chamber wall is shown at 252. There is a relatively large opening 254 in the wall of the drying chamber, and two pairs of rollers are provided. An inner pair of rollers 256 and 258 has a nip through which the material to be dried is passed, and these nip rollers 256 and 258 made of rubber or other deformable material. The direction of travel from the outside to the inside of the drying chamber 10 is indicated by the arrow in FIG. 9. The other pair of rollers 260 and 262 are hard surfaced rollers of somewhat larger diameter than the nip rollers 256 and 258, and these rollers 260 and 262 are mounted in stationary journal bearings. Moreover, the arrangement of the rollers is such, that an imaginary line passing through the axes of the rollers 256 and 260 is inclined at approximately 45° to the horizontal path of the material 250, and likewise the imaginary line passing through the axes of the rollers 258 and 262 is inclined at approximately 45° to the path of the material 250.

The arrangement illustrated in FIG. 9 is suitable for use where the operating pressure within the drying chamber 10 is higher than the ambient atmospheric pressure outside the drying chamber. The action of the differential pressure between the inside and the outside of the drying chamber is to press the nip rollers 256 and 258 into the gap between the outer rollers 260 and 262, and this presses the rollers 256 and 258 hard on to the outer rollers 260 and 262, deforming them slightly, and at the same time causes the nip rollers to grip tightly on to the material 250. As a result, although the rollers are still rotatable and allow the material 250 to travel into the drying chamber 10, they also form an effective seal preventing egress of vapour or gas from the inside of the drying chamber 10.

A self-lubricating sealing pad 264 presses on to each of the outer rollers 260 and 262, and is itself connected to the wall 252 of the drying chamber 10 by a flexible sealing member 266.

It will be appreciated, that the seal shown in FIG. 9 is duplicated at the material exit from the drying chamber, that is to say the nip rollers are on the inside of the outer rollers 260 and 262. In an arrangement in which the interior of the drying chamber is to be at a pressure less than atmospheric pressure, the construction would be reversed, that is to say, that the nip rollers 256 and 258 would be on the outside of the outer rollers 260 and 262, so that the pressure differential between the outside and the inside of the drying chamber, would again tend to force the nip rollers into slightly deformed engagement with the outer rollers 260 and 262, and towards each other.

Although the arrangement illustrated in FIG. 9 provides a method of sealing the rollers at the entrance and exit of the drying chamber, along the length of those rollers, there is still the problem of possible leakage of vapour or gas outwardly, in the case of a drying chamber operating at above atmospheric pressure, or leakage of air into the drying chamber in the case where the interior of that chamber is at a lower pressure than atmospheric, at the ends of the rollers. An arrangement has been devised therefore for sealing the ends of the rollers, and this is illustrated in FIG. 10, as applied to the nip rollers 256 and 258. It is to be understood, however, that this method can be applied to any of the rollers either at the entrance or the exit of the drying chamber. Inside that wall 252 of the drying chamber which houses the journal bearings for the rollers 256 and 258, there is a lining 270 of resilient material such as rubber. The inside of this lining 270 has a facing 272 of polytetrafluorethylene (P.T.F.E.). The ends of the rollers 256 and 258 which are engageable with the facing 272 are ground square, and an annular groove 274 is formed in each of these end faces. An air supply port 276 is provided for each of these rollers, this supply port being drilled through the wall 252, and through the lining 270 and the P.T.F.E. facing 272. Each of the ports 276 is aligned with a respective one of the anular recesses 274 in the ends of the rollers 256 and 258.

An external supply of fluid under pressure is passed through each port 276, and flows around the anular recess 274 of the associated roller where from which it can escape as an outwardly flowing lubrication film between the facing 272 and the end of the roller. Because of this outwardly flowing boundary layer film, it is not possible for air, vapour or gas to pass the end of the roller, in either direction.

If there is any leakage of air into the drying chamber, then a mixture of air and vapour or gas is extracted and fed to the compressor. This changes the thermal characteristics of the compressed vapour/gas mixture (Dalton's Laws) and reduces the efficiency of the heating cycle. An increasing proportion of air will be drawn into the compressor and eventually the efficiency of the system so reduced that effective drying will cease. (Carried to the limit, virtually hot air only will be passed through the heat exchanger.) It becomes vital therefore to prevent air entering the drying chamber.

In FIG. 11 there is shown an arrangement, which can be applied to any of the specific embodiments previously described, for the purpose of ensuring that there is no ingress of air into the drying chamber. The basic components of the system illustrated in FIG. 11 are the drying chamber 10, the heat exchanger 12, the first conduit 16, the compressor 18, and a second conduit 19 leading from the output side of the compressor 18 to the input side of the heat exchanger 12. A condensate conduit 281 leads away from the heat exchanger 12, and there is a valve controlled outlet 282, which supplies a small stream of liquid condensate on to part of the conduit 19. In fact, there may be convolutions formed in the conduit 19 at this point to give a greater surface area on which the liquid condensate can drop. Immediately the condensate impinges on the conduit 19, it will flash off as steam, which increases the pressure within the drying chamber 10 to a pressure higher than the ambient atmosphere outside the drying chamber, so as to ensure that any flow which does occur between the interior of the chamber and the ambient atmosphere outside is in the outward direction. This ensures that there is no ingress of air into the drying chamber.

FIG. 12 illustrates apparatus which is useful where a continuous web of material such as paper 290 is being dried as it passes through the drying chamber, and wherein the interior of the drying chamber is maintained at above atmospheric pressure. The material 290 passes along a horizontal path, and at least part of the heat exchanger indicated at 292 is located within a frame 294 which is immediately above and in close proximity to the horizontal run of the material 290. The top portion of the frame 294 above the heat exchanger 292 is thermally insulated, so that most of the heat given off by the heat exchanger is directed on to the material 290 as it passes through the chamber. The close proximity of the heat exchanger 292 to the material 290 allows the generated vapours to be raised in temperature, and as these high temperature vapours are held in close proximity to the material 290, further evaporation of moisture from the material is induced by the temperature of the vapour itself.

As has been mentioned previously, it is highly desirable to prevent the ingress of air into the drying chamber because any air which mixes with the vapour or gas reduces the efficiency of the apparatus. In FIG. 13 there is shown an arrangement which is designed to avoid the ingress of air.

A drying chamber 300 has a heat exchanger 302 located in it, and a conduit 301 leads from the interior of the chamber 300 to a compressor 304. Another conduit 303 leads from the output side of the compressor 304 to the input side of the heat exchanger 302. The output from the heat exchanger—which will preferably be in the form of condensate—passes through a conduit 305, and this condensate is dealt with as described with reference to any one of FIGS. 1 to 3.

At one side of the drying chamber 300, there is an inlet chamber 306, and at the opposite side there is an exit chamber 308. The apparatus shown in FIG. 13 is intended for drying web-like material 310 (such as paper) which passes horizontally through the inlet chamber 306, through the drying chamber 300 and out through the exit chamber 308. The inlet chamber 306 has two sealing roller arrangements 312 and 314, each of which is substantially as described with reference to FIGS. 9 and 10 of the drawings. It will be observed that the sealing rollers are arranged to prevent escape of fluid under pressure from the inside of the inlet chamber 306 (a) to atmosphere and (b) into the drying chamber.

A condensate to conduit 307 leads from the conduit 305 (i.e. it takes the vapour and/or condensate from the heat exchanger 302) to a coil 316 within the inlet chamber 306, and condensate liquid is bled off at 309 and allowed to fall on the hot coil 316. This is similar to the arrangement described with reference to FIG. 11 of the drawings. Steam flashes off the coil 316, and the arrangement is such that it creates a vapour pressure greater than 1 BAR (atmospheric pressure) in the inlet chamber 306.

Now the rollers 312 should prevent leakage of fluid, but if any leakage occurs, it will be from the inlet chamber 306 to atmosphere, and there will be no tendency for air to flow into the inlet chamber. Consequently, the inlet chamber presents a barrier to air flow with the material 310 into the drying chamber 300. If the inside of the drying chamber 300 is at or below atmospheric pressure, there will be a tendency for vapour to flow from the inlet chamber into the drying chamber, but this is of no consequence, because the slight addition to the vapour in the drying chamber which might occur will not affect the drying operation. If the drying chamber 300 is fitted with an over pressure arrangement as shown in FIG. 11, then if the pressure in the drying chamber exceeds that in the inlet chamber there will be a tendency of vapour to flow out of the drying chamber into the inlet chamber, but this will only assist in preventing the flow of air into the inlet chamber.

· The exit chamber 308 is of similar construction to the inlet chamber 306, that is to say, it has sealing roller arrangements 318 and 320, arranged respectively between the drying chamber amd the exit chamber, and between the exit chamber and atmosphere; a condensate conduit 311 from the heat exchanger 302; a coil 322 and a condensate bleed off 313 for producing vapour in the exit chamber. The exit chamber is over-pressurised to prevent ingress of air in exactly the same manner as the inlet chamber 306.

It is known that when a liquid changes state and becomes a gas or vapour, then an increase in volume occurs. In the various forms of drying apparatus described above, in which there is a fluidised bed of particulate heat conducting material, use is made of the phenomena of volume increase, by locating the heat exchangers in such a manner as to cause agitation of any particles which are suitable for fluidisation, i.e. any particles of the material which is to be dried, or any particles of the additional heat conducting material, which is provided in the chamber. Such additional heat conducting material may for example comprise sand, rice grains, glass beads or the like.

The action of a conventional fluid bed is similar in some respects to the heat transference in the drying apparatus which is the subject of this invention, but it should be noted that a conventional fluid bed system depends upon an external supply of gas which is passed through the particulate bed, whereas in the present apparatus and method, the gas is generated by the material which is being dried, as a function of the change of state of the moisture or solvent from a liquid to a gas, when the material which is dried is in proximity to the heat exchanger. Consequently, in the drying apparatus and method which is the subject of this invention, it is unnecessary to provide a separate supply of gas to effect fluidisation. The velocity and temperature of the vapour or gas generated is a function of the design of the heat exchanger and is relative to the rate of heat transference, the surface area and the location of the heat exchanger.

In the arrangement illustrated in FIG. 11, the condensate falls from the outlet 282 on to a coil in the conduit 19 within the drying chamber 10. It is to be understood however that the steam generation to provide the increased pressure within the drying chamber may take place anywhere in the system which is in communication with the chamber 10. For instance, the condensate outlet and coil could be located in the conduit 16 leading to the compressor 18.

In a modified arrangement, hot water condensate is injected into the suction side of the compressor 18. This has two effects, viz:

(i) It lowers the temperature of the compressor and hence is a means of preventing overheating of the compressor, and (ii) It creates additional vapour at the discharge pressure of the compressor. This additional vapour is available in the drying chamber to create the required excess pressure in that chamber.

Because the interior of the drying chamber is at a pressure greater than that existing outside the chamber, there is, or may be, an outflow of vapour, and this represents a heat loss. In the case where the material being dried is in a continuous length (e.g. fabric) the material passes through an inlet passage as it approaches the drying chamber and through an outlet passage as it leaves the drying chamber. Any outflow of vapour into the inlet passage tends to pre-heat the material which is advantageous. It is preferred however, to provide a pipe leading from the outlet passage to the inlet passage, and if necessary to fit a small pump in this pipe, so that vapour flowing out of the drying chamber into the outlet passage is taken to the inlet passage to assist in the pre-heating of the material.

I claim:

1. A method of generating vapour in a drying process, the process utilising a fluid bed drying chamber, a compression system including a compressor and a heat exchanger, the process including drying moisture containing material located in said fluid bed drying chamber, subjecting the material in said fluid bed to heat emitted by said heat exchanger located in said fluid bed so that vapour is given off by the material, at least some of the vapour given off by said material being dried being compressed in said compression system, vapour being generated by injecting hot water condensate into the suction side of said compressor of the compression system to create in said drying chamber an internal pressure greater than that existing on the outside of said drying chamber in order to prevent air from entering the chamber, part of the vapour from said compression system being passed through said heat exchanger 50 that part of the latent heat of evaporation of the vapour at the increased pressure is used to create the necessary temperature gradient between said heat exchanger and said material to be dried within said drying chamber to cause the heat emission for drying the material, and part of the vapour leaving said compression system being supplied to said chamber to cause fluidisation of the material in said fluid bed, and recycling vapour which has left said heat exchanger back through said compression system.

2. Apparatus for generating vapour in a drying process for drying moisture-containing material comprising a fluid bed drying chamber, a heat exchanger located in the fluid bed, and extraction means for withdrawing gaseous fluid from the drying chamber, a compression system including a compressor for compressing vapour withdrawn from the drying chamber, first conduit means leading from said compression system to the imput side of said heat exchanger, and second conduit means leading from said compression system to said fluid bed, means being provided to inject hot water condensate into the suction side of said compressor for producing additional vapour to create a pressure within said drying chamber greater than that existing on the outside of said drying chamber in order to prevent air flowing into said drying chamber, and recycling means for recycling vapour which has left said heat exchanger back through said compression system.

* * * * *